Nov. 22, 1966   R. L. LICH   3,286,656
RESILIENT RAPID TRANSIT TRUCK
Filed Jan. 2, 1964   2 Sheets-Sheet 1

INVENTOR;
RICHARD L. LICH
BY Bedell & Burgess
ATTORNEYS

Nov. 22, 1966   R. L. LICH   3,286,656
RESILIENT RAPID TRANSIT TRUCK
Filed Jan. 2, 1964   2 Sheets-Sheet 2

INVENTOR:
RICHARD L. LICH
BY Odell & Burges
ATTORNEYS

United States Patent Office

3,286,656
Patented Nov. 22, 1966

3,286,656
RESILIENT RAPID TRANSIT TRUCK
Richard L. Lich, St. Louis, Mo., assignor to General Steel Industries, Inc., Granite City, Ill., a corporation of Delaware
Filed Jan. 2, 1964, Ser. No. 335,277
10 Claims. (Cl. 105—199)

The invention relates to railway rolling stock and consists particularly in an improved truck for passenger cars, especially motor cars.

Equalized trucks are of two general types; i.e., trucks having separate side frames tiltable relative to each other about a common transverse axis, such as the usual freight car trucks, and trucks having a rigid frame to which the axle boxes are connected for vertical movement relative to the frame, with equalizing beams at each side carried by the axle boxes at both ends and supporting the frame by means of metal springs, usually coil springs such as most conventional passenger car trucks.

Trucks of the first type, although relatively light in weight, simple of construction, and fully equalized, are not entirely satisfactory for high speed passenger service because their three-piece frame construction comprising two side frames and a connecting transverse bolster does not effectively retain the axles in tram after the connections between the three parts have become worn in service, with consequent flange wear and danger of derailment.

Conventional passenger car trucks, while obviating the disadvantages of the first type of truck, and generally providing a comfortable ride with maximum safety, are relatively heavy and complex, their frames usually having pedestal legs for slidably mounting the journal boxes, at right angles to the general plane of the frame. In most such trucks the equalizers are loosely seated on the axle boxes and the frame is supported by springs seated on the equalizers. This makes it necessary in many cases to support auxiliary devices, such as third rail shoes, brakes, motors and the like from the spring-supported frame, because, even though there are advantages to supporting some of these devices from unsprung structure, such as the equalizers, the torque reaction of the equalizers to the acceleration and retardation forces developed by the motors and brakes would tend to tilt the equalizers transversely of the truck. Also, in such trucks, due to the yieldability of the equalizer springs, which are of necessity relatively closely spaced transversely of the truck, some of the transverse roll of the body is accommodated by these springs, as well as the more widely spaced bolster springs, the close spacing of the equalizer spring making it difficult to control transverse roll because of the relatively short transverse moment arm through which the equalizer springs resist roll. Moreover, the use of necessarily long equalizer springs, or in some cases, of frame supporting springs positioned over the journal boxes, requires a relatively high truck profile to accommodate them.

It accordingly is a main object of the invention to provide an equalized rigid frame truck on which auxiliary devices such as brakes, motors, and the like may be mounted on structure unsprung from the wheels and axles.

It is a further object to provide an equalized rigid frame truck in which substantially all body roll is accommodated and resisted by the bolster springs.

It is a further object to provide an equalized rigid frame truck having a substantially lower profile than conventional equalized rigid frame trucks.

It is an additional object to provide a lighter weight, lower cost, simpler, equalized rigid frame truck than conventional equalized rigid frame trucks.

The foregoing and additional more detailed objects and advantages are achieved by the trucks described hereinafter and illustrated in the accompanying drawings, in which.

Figure 1:
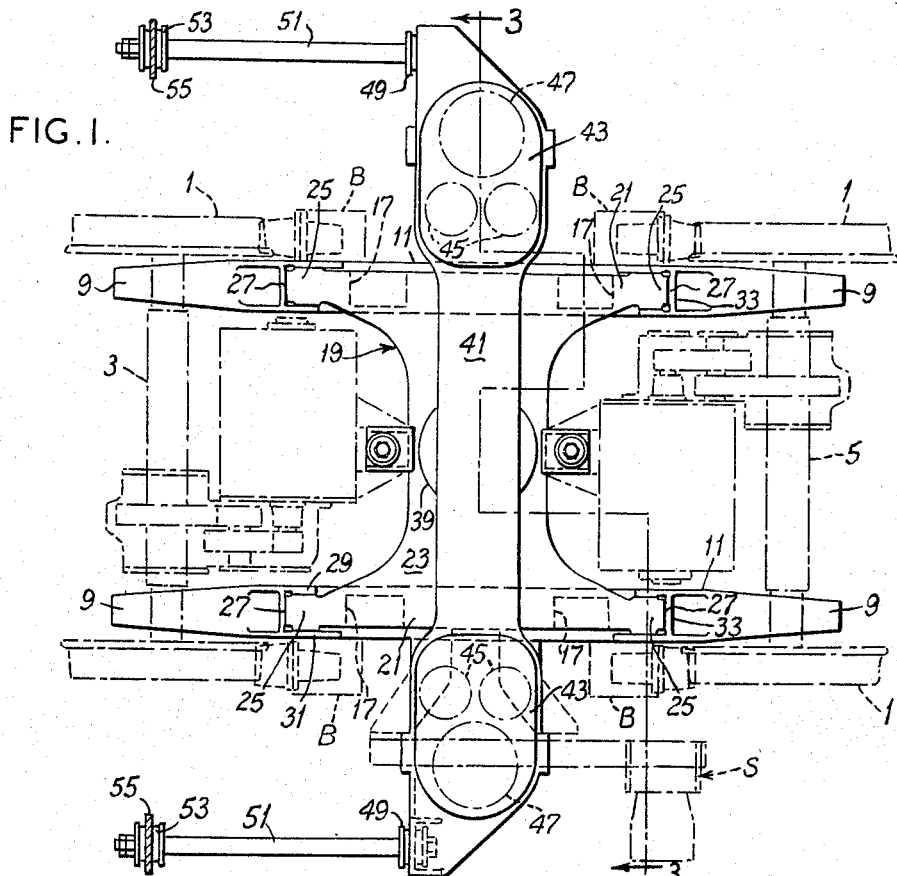
FIG. 1 is a plan view of a truck embodying the invention.

The truck includes flanged wheels 1, pairs of which are mounted on the ends of spaced axles 3 and 5. Inwardly of wheels 1, axles 3 and 5 mount journal boxes 7, on which are nonresiliently mounted the end portions 9 of transversely spaced truck side frames 11, which extend longitudinally of the truck between the axles and are depressed intermediate their ends as at 13 to a level lower than the axle centers. The upper surfaces of depressed intermediate portions 13 of side frames 11 are substantially horizontal and are formed near their ends with seats 15 on which are seated flat pad devices 17 of elastomeric material such as rubber, pads 17 preferably comprising several layers of rubber interleaved by steel plates and bounded by steel plates on their upper and lower surfaces. For tying the side frames together and providing means for mounting the car bodies thereon, a transverse frame member 19, of H configuration in plan, comprises a transverse member 23 and longitudinally extending side members 21 spaced apart transversely of the truck and overlying the side frames 11, and is supported through its side members 21 on pad devices 17. The end portions 25 of side members 21 are of generally rectangular shape in plan and are vertically slidably received in mating recesses 27 formed in the side frames by projecting their inner and outer walls 29 and 31 upwardly and connecting them with transverse walls 33.

Pad devices 17 are substantially compressed under the vertical load and their stiffness under this compression, combined with their substantial transverse width, cooperates with the engagement of the vertical sides of the frame side members 21 with side frame walls 29 and 31 to effectively resist substantial tilting of side frames 11 about their longitudinal axes relative to main frame 19 as the result of torque applied to the side frames by auxiliary devices such as package brakes B, which are attached at 36 to side frame outer walls 31, but permits slight tilting of the side frames about a transverse axis relative to the main frame and to each other responsive to the differential loads caused by differing vertical irregularities in the track rails, to provide differential equalization.

At the same time the engagement of the end portions 25 of main frame side members 21 with walls 29, 31 and 33 of the side frames rigidly maintains the truck in tram, i.e., with its parts in normal squared relation in the horizontal plane. For supporting a car body underframe U on the trucks, main frame transverse member 19 is formed at its center with a pivotal central bearing 37 which is in pivotal and load supporting engagement with a mating central bearing 39 formed on the center of a transverse bolster 41, the end portions of which are recessed as at 43, outwardly of the frame members, to provide seats for coil springs 45 and fluid springs 47 disposed transversely outwardly of coil springs 45, this arrangement of the springs forming the subject matter of Oliver G. Short et al. Patent 3,092,042.

The end portions of bolster 41 are pivotally connected as at 49 to longitudinally extending anchor links 51, the opposite ends of which are similarly connected at 53 to brackets 55 depending from underframe U so that relative vertical and transverse movements as may be accommodated by springs 45 and 47 are permitted between underframe U and bolster 41 but bolster 41 is held against longitudinal or swiveling movements relative to the underframe, such movements between the body and the truck being accommodated by swiveling of bolster 41 on truck frame 19 through mating central bearings 37, 39.

During operation of a car equipped with these trucks, as the side frames are relatively tilted longitudinally, their tilt is accommodated by pad devices 17, end portions 25 of main frame side members 21 sliding vertically in side frame recesses 27 to accommodate such movements, but being held therein by side frame walls 29, 31 and 33 against any movement longitudinally or transversely relative to the side frames, thereby maintaining the side frames in tram with each other. Upon application of brakes B, even though the latter are mounted on the side frames by attachment at 36 to side frame outer walls 31, any tendencies of the brakes to tilt the side frames transversely of the truck is resisted by the stiffness and lateral dimension of pads 17 and by the engagement of main frame side member end portions 25 with the side frame recess-forming walls 29 and 31. In view of the stiffness of elastomeric pads 17, main frame 19 will remain at all times substantially parallel to the general plane of the track so that all body roll will be accommodated and resisted by the widely spaced air and coil springs 45, 47, and principally by the latter under substantial load conditions as described in the Short et al. patent referred to above.

Figure 2:
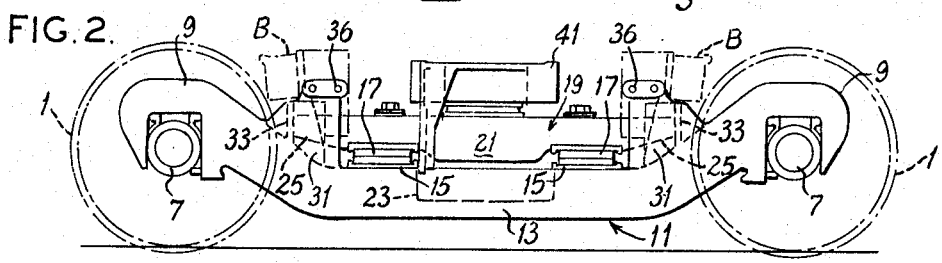
FIG. 2 is a side elevation view of the truck illustrated in FIG. 1.
Figure 3:
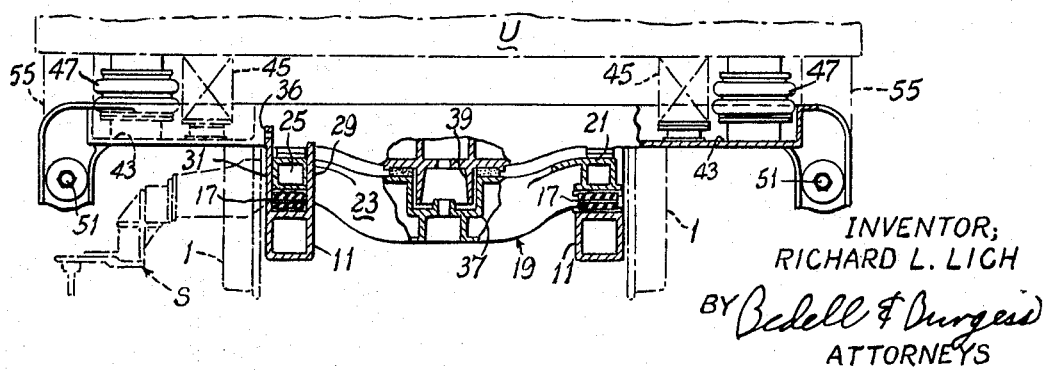
FIG. 3 is a transverse vertical sectional view along line 3–3 of FIG. 1.
Figure 4:
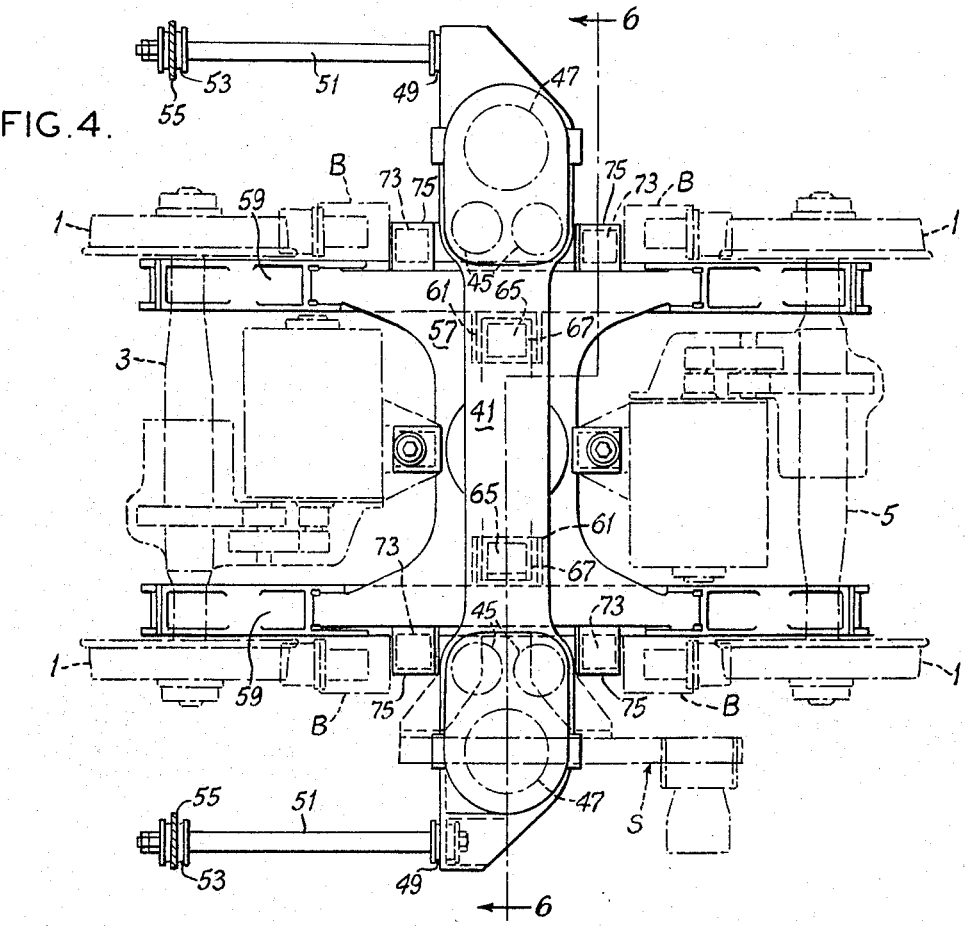
FIG. 4 is a plan view of a modified form of truck embodying the invention.
Figure 5:
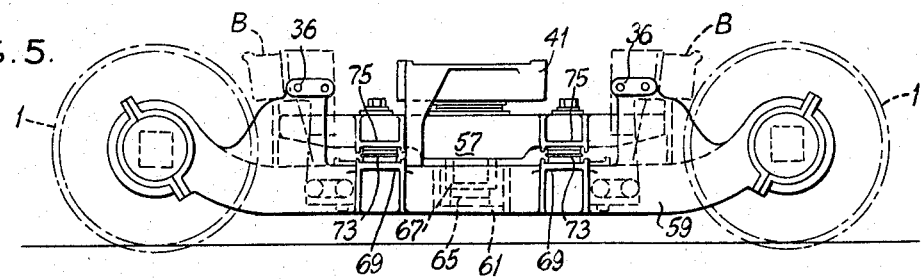
FIG. 5 is a side elevation view of the truck illustrated in FIG. 4.
Figure 6:
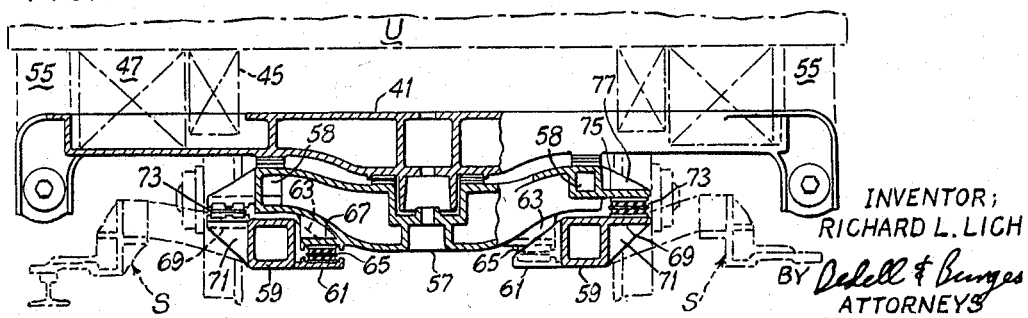
FIG. 6 is a transverse vertical sectional view along line 6–6 of FIG. 4.

Another form of the invention is shown in FIGS. 4–6, in which means are provided for resisting substantially greater torque reactions in the side frames resulting from side frame-mounted auxiliary devices such as brakes B, third rail shoe mounting structures S, and the like, or even traction motors. In describing this form of the invention the same reference numerals are used as in connection with FIGS. 1–3 except when the parts are substantially different. The general organization of the truck is similar to the form of the invention shown in FIGS. 1–3, the principal difference being in the arrangement of the pad devices for supporting main frame 57, partly through its side members 58, on side frames 59. To provide means for resisting higher torque reactions on the side frames without substantially interfering with the differential equalizing function of the truck, substantially at their centers the bottom walls of side frames 59 are extended inwardly to form brackets 61 reinforced at each side by gussets 63 spaced apart longitudinally of the truck, and elastomeric pad devices 65 are seated on brackets 61 and support main frame 57 by horizontal brackets 67 formed on the bottom wall thereof and seated on pad devices 65. The top walls of side frames 59 are extended outwardly to provide brackets 69 spaced apart lengthwise of the truck and supported by gussets 71. Elastomeric pad devices 73 are seated on brackets 69. The bottom walls of main frame side members 58 are extended outwardly to form downwardly facing brackets 75 in vertical registry with side frame brackets 69 and reinforced by gussets 77, brackets 75 resting on pad devices 73 and thereby partially supporting main frame 57 from the side frames, the transverse spacing of inner pad devices 65 and outer pad devices 73 providing a moment arm to cooperate with the stiffness of the pad devices to resist any tendencies of the side frames to tilt about an axis extending longitudinally of the truck, and thereby permit the attachment of torque-producing auxiliary devices to the side frames without resulting in substantial and objectionable tilting of the side frames about their longitudinal axes.

The body is mounted on the trucks in the same way as described in connection with the first embodiment although it will be understood that other well-known means for supporting a body from the truck frame may be utilized, such as the conventional swing motion bolster, in connection with both forms of the invention.

The details of the trucks may be modified substantially without departing from the spirit of the invention and the exclusive use of such modifications as come within the scope of the appended claims is contemplated.

What is claimed is:

1. A railway truck comprising wheels, axles, a pair of transversely-spaced longitudinally extending side frames supported at their ends on said axles and having upwardly facing flat horizontal surfaces, substantially horizontal flat elastomeric pad devices of substantial width transversely of the truck seated on said upwardly facing surfaces and spaced apart longitudinally of the truck, a rigid frame extending transversely of the truck and having downwardly facing flat horizontal surfaces supported on said pad devices, and cooperating means on said rigid frame and both said side frames opposing relative horizontal movements of said frames, said pad devices opposing by their resistance to compression transverse tilting of said side frames relative to said rigid frame but permitting differential longitudinal tilting of said side frames relative to said rigid frame responsive to differing vertical irregularities in the two track rails.

2. A railway truck according to claim 1 in which said pad devices are positioned longitudinally inwardly of the truck from said axles.

3. A railway truck according to claim 2 in which the portions of said side frames on which said pad devices are seated is at a lower level than said axles.

4. A railway truck according to claim 1 in which said pad devices on each side frame are aligned with each other longitudinally of the truck.

5. A railway truck according to claim 4, in which each side frame mounts an additional pad device spaced transversely of the truck from said first named pad devices and forming a third support for said rigid frame member.

6. A railway truck according to claim 5 in which said first-named pad devices are positioned transversely outboard of the longitudinal axis of each said side frame and said additional pad devices are positioned transversely inboard of the longitudinal axis of each said side frame.

7. A railway truck according to claim 6 in which said side frames and rigid frame are provided with inboard and outboard brackets for respectively seating and being seated on said pad devices.

8. A railway truck according to claim 1 including means for securing auxiliary devices to said side frames.

9. A railway truck according to claim 1, in which said cooperating means includes pairs of opposing longitudinal vertical surfaces on each said side frame and said rigid frame, said pairs being spaced apart lengthwise of the truck.

10. A railway truck according to claim 1 in which each said side frame is provided with transversely spaced upstanding walls spaced apart lengthwise of the truck and portions of said rigid frame are vertically slidably received between said upstanding walls.

References Cited by the Examiner
UNITED STATES PATENTS

| | | | |
|---|---|---|---|
| 2,211,462 | 8/1940 | Hobson | 105—197.2 |
| 2,877,719 | 3/1959 | Lich | 105—199 |
| 2,908,230 | 10/1959 | Dean | 105—199 |

MILTON BUCHLER, *Primary Examiner.*

ARTHUR L. LA POINT, *Examiner.*

H. BELTRAN, *Assistant Examiner.*